United States Patent
Tautz (10) Patent No.: US 9,945,395 B2
(45) Date of Patent: Apr. 17, 2018

(54) CONTROL DEVICE FOR A HYDRAULIC CYLINDER UNIT WITH AN INDIVIDUAL VALVE CONTROLLER

(71) Applicant: SIEMENS AKTIENGESELLSCHAFT, Munich (DE)

(72) Inventor: Wilfried Tautz, Forchheim (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 729 days.

(21) Appl. No.: 14/401,684

(22) PCT Filed: Apr. 24, 2013

(86) PCT No.: PCT/EP2013/058423
§ 371 (c)(1),
(2) Date: Nov. 17, 2014

(87) PCT Pub. No.: WO2013/171041
PCT Pub. Date: Nov. 21, 2013

(65) Prior Publication Data
US 2015/0142183 A1    May 21, 2015

(30) Foreign Application Priority Data
May 16, 2012   (EP) .................... 12168164

(51) Int. Cl.
*G05D 7/00*     (2006.01)
*F15B 9/09*     (2006.01)
(Continued)

(52) U.S. Cl.
CPC ............. *F15B 9/09* (2013.01); *G05B 11/38* (2013.01); *G05B 15/02* (2013.01); *G05D 7/0635* (2013.01);
(Continued)

(58) Field of Classification Search
CPC .......................................... F15B 9/09
(Continued)

(56) References Cited

U.S. PATENT DOCUMENTS 3,110,152 A * 11/1963 Johnson ............. B60K 17/10
                                                    60/445
4,653,986 A *  3/1987 Ashton ............... F04B 9/113
                                                    417/243
(Continued)

FOREIGN PATENT DOCUMENTS

DE   102007003243   7/2008
DE   102007051857   4/2009
(Continued)

OTHER PUBLICATIONS

English language International Search Report for PCT/EP2013/058423, dated Sep. 10, 2013, 4 pages.
(Continued)

*Primary Examiner* — Evral E Bodden
(74) *Attorney, Agent, or Firm* — Staas & Halsey LLP (57) ABSTRACT

A control device controls a hydraulic cylinder unit having a piston. The device receives a setpoint variable and an actual variable and determines, based on a difference between the setpoint variable and the actual variable, a preliminary manipulated variable for valves of the hydraulic cylinder unit. The setpoint variable and the actual variable relate to a position of the piston or a force applied by the piston. Linearization factors are determined dynamically as a function of the actual position of the piston and working pressures on both sides of the piston and a hydraulic fluid tank/pump. Definitive manipulated variables to control the valves are determined from the preliminary manipulated variable and the linearization factors. With the linearization factors, a ratio of the piston adjustment speed to the difference between the setpoint variable and the actual variable is
(Continued)

independent of the actual position of the piston and the working pressures.

10 Claims, 5 Drawing Sheets

(51) Int. Cl.
    *G05B 11/38*     (2006.01)
    *G05B 15/02*     (2006.01)
    *G05D 7/06*     (2006.01)

(52) U.S. Cl.
    CPC ............. *F15B 2211/6336* (2013.01); *F15B 2211/6656* (2013.01); *F15B 2211/7053* (2013.01)

(58) Field of Classification Search
    USPC .................................................. 700/282
    See application file for complete search history.

(56) References Cited

U.S. PATENT DOCUMENTS

| | | | |
|---|---|---|---|
| 4,777,797 A * | 10/1988 | Mucheyer | F04B 49/08 60/329 |
| 7,114,432 B1 * | 10/2006 | Boone | F04B 1/324 417/222.1 |
| 8,301,276 B2 | 10/2012 | Tautz et al. | |
| 8,408,032 B2 | 4/2013 | Felkl et al. | |
| 8,591,200 B2 * | 11/2013 | Marica | F04B 47/04 417/385 |
| 2009/0097986 A1 | 4/2009 | Nakata et al. | |
| 2011/0010067 A1 * | 1/2011 | Rubenbauer | B60T 8/172 701/70 |

FOREIGN PATENT DOCUMENTS

| | | |
|---|---|---|
| EP | 1965083 | 9/2008 |
| EP | 12168164.7 | 5/2012 |
| WO | PCT/EP2013/058423 | 4/2013 |

OTHER PUBLICATIONS

European Search Report for European Priority Patent Application No. 12168164.7, dated Oct. 22, 2012, 6 pages.

* cited by examiner

CONTROL DEVICE FOR A HYDRAULIC CYLINDER UNIT WITH AN INDIVIDUAL VALVE CONTROLLER

CROSS REFERENCE TO RELATED APPLICATIONS

This application is based on and hereby claims priority to International Application No. PCT/EP2013/058423 filed on Apr. 24, 2013 and European Application No. 12168164.7 filed on May 16, 2012, the contents of which are hereby incorporated by reference.

BACKGROUND

The present invention is based on a control device for controlling a hydraulic cylinder unit, wherein the control device has a controller which receives, on its input side, a setpoint variable and an actual variable and determines, on the basis of the difference between the setpoint variable and the actual variable, a preliminary manipulated variable for a valve control unit of the hydraulic cylinder unit.

Hydraulic cylinder units exhibit a control behavior which is strongly dependent on the operating point of the hydraulic cylinder unit. A controller that has been optimized for a specific operating point operates less well or badly at other operating points.

To improve the control behavior it is known in the related art that what is referred to as a butterfly curve is used as a control characteristic of the controller. The butterfly curve however does not cover the entire area of possible operating points and therefore does not operate optimally in each operating state.

Furthermore it is known for position controllers for hydraulic cylinder units that a non-linear transformation is undertaken in each case independently for the setpoint position and the actual position and in addition a part linearization of the position controller is undertaken. This method of operation however is very complex.

DE 10 2007 051 857 B3 and US 2010/294 125 A1, which have the same content, disclose a control device for controlling a hydraulic cylinder unit of the type explained above. This control device delivers optimum control results both in position control and also in force control.

SUMMARY

One possible object relates to creating options by which a control device of the type stated at the start is able to be employed more flexibly in a simple way.

The inventor proposes a control device for controlling a hydraulic cylinder unit,
wherein the control device has a controller which, on its input side, receives a setpoint variable and an actual variable and on the basis of the difference between setpoint variable and actual variable, determines a preliminary manipulated variable for valve control units of the hydraulic cylinder unit,
wherein the setpoint variable is a setpoint position to be taken up by a piston of the hydraulic cylinder unit and the actual variable is an actual position taken up by the piston or the setpoint variable is a setpoint force to be exerted by the piston and the actual variable is an actual force exerted by the piston,
wherein a linearization unit is arranged downstream of the controller, which determines, on the basis of the preliminary manipulated variable and linearization factors, a definitive manipulated variable which it outputs to a valve control unit, so that the piston is adjusted with an adjustment speed,
wherein the linearization unit determines the linearization factors dynamically as a function of the actual position of the piston and on both sides of the piston as well the working pressures on the pump side and the tank side of the valve control units,
wherein the linearization unit determines the linearization factors such that a ratio of the adjustment speed to the difference between setpoint variable and actual variable is independent of the actual position of the piston and the working pressures.

A number of valve control units are thus present, for which a unique manipulated adjustment variable is determined in each case.

Preferably the linearization unit is additionally supplied with a parameter which the linearization unit takes into account for determination of the linearization factors. This enables at least one further boundary condition to be adhered to.

In the simplest case the linearization unit, in the event of the parameter having a first value, determines the linearization factors such that two of the linearization factors have the value zero and two other of the linearization factors have values differing from zero. The two other linearization factors can especially have the same value as each other. In this case the same behavior is produced as with a conventional single valve control unit, i.e. as in DE 10 2007 051 857 B3.

As an alternative or in addition it is possible for the linearization unit, in the event of the parameter having a second value, to determine the linearization factors such that the sum of the working pressures obtaining on both sides of the piston approaches the sum of the working pressures obtaining on the pump and tank side of the valve control units. In this case an especially low pressure difference at the valve control units is produced.

It is possible for the valve control units to be embodied as proportional valves. Preferably the valve control units are embodied as binary-switched switching valves however.

The control unit can be embodied as a hardware structure. Preferably however it is embodied as a software-programmable control device and programmed with a software module, so that it is embodied on the basis of the programming with the software module.

The software module comprises machine code, the processing of which by a software-programmable control device linked to a hydraulic cylinder unit has the effect that the control device is embodied as described above. The software module can be stored in machine-readable form on a data medium.

In principle the proposed control device is universally-applicable. Preferably however it is used for adjustment control of a roll stand.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
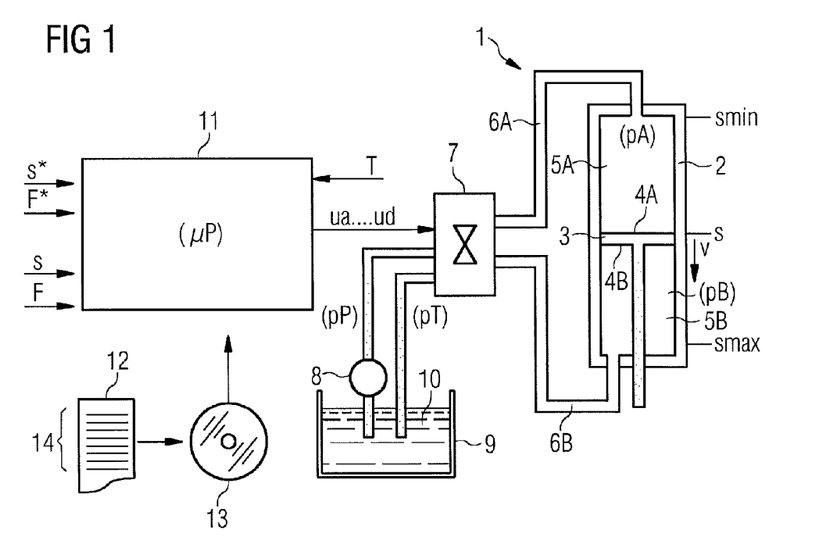
FIG. 1 shows a block diagram of a control device and of a hydraulic cylinder unit.

In accordance with FIG. 1 a hydraulic cylinder unit 1 has a hydraulic cylinder 2 in which a piston 3 is movably supported. The piston 3 is able to be moved within the hydraulic cylinder 1 between a minimum position smin and a maximum position smax. It is thus located at each point in time at an actual position s, which lies between the minimum position smin and the maximum position smax.

The piston 3 has a first operating surface 4A and a second operating surface 4B. Each operating surface 4A, 4B faces towards a corresponding working volume 5A, 5B.

The working volumes 5A, 5B are connected hydraulically to a hydraulic pump 8 and a hydraulic reservoir 9 via hydraulic paths 6A, 6B and a valve control device 7. The hydraulic paths 6A, 6B extend in this case from the respective working volumes 5A, 5B to the valve control unit 7.

If the piston 3 is located in its minimum position smin, a specific volume of a hydraulic fluid 10 is located in hydraulic path 6A. This volume is the minimum quantity of hydraulic fluid 10 which is located between the valve control device 7 and the working surface 4A of the piston 3. This quantity of hydraulic fluid 10 is the minimum possible effective volume for the working volume 5A. It will be referred to hereafter by the reference term VminA.

In a similar manner a specific quantity of hydraulic fluid 10 is located in the hydraulic fluid path 6B when the piston 3 is located in its maximum position smax. This quantity of hydraulic fluid 10 represents a minimum possible effective volume for the working volume 5B. This minimum volume will be referred to below by the reference term VminB.

When the piston 3 is located in any given actual position s, the working volume 5A has a volume value VA, which is expressed as $$VA = VminA + AKA(s - smin).$$

The reference term AKA here refers to the surface value of the operating surface 4A facing towards the working volume 5A of the piston 3. It is further possible to divide the effective volume VA by the surface value AKA. The quotient $$hA = VA/AKA$$

corresponds to an effective height of a column of the hydraulic fluid 10 above the piston 3.

In a similar way, on the basis of the minimum possible effective volume VminB, of the surface value AKB of the operating surface 4B facing towards the operating volume 5B, of the actual position s and of the maximum position smax are determined in accordance with the values VB and hB corresponding to the equations $$VB = VminB + AKB(smax - s)$$

and $$hB = VB/AKB$$

for the second working surface 4B or the second working volume 5B.

A first working pressure pA obtains in working volume 5A, a second working pressure pB obtains in second working volume 5B. A pump pressure pP is applied via the hydraulic pump 8 to the hydraulic fluid 10. A tank pressure pT obtains in the hydraulic reservoir 9. The pump pressure pP and the tank pressure pT correspond to a working pressure obtaining on the pump side and on the tank side of the valve control unit 7.

Figure 2:
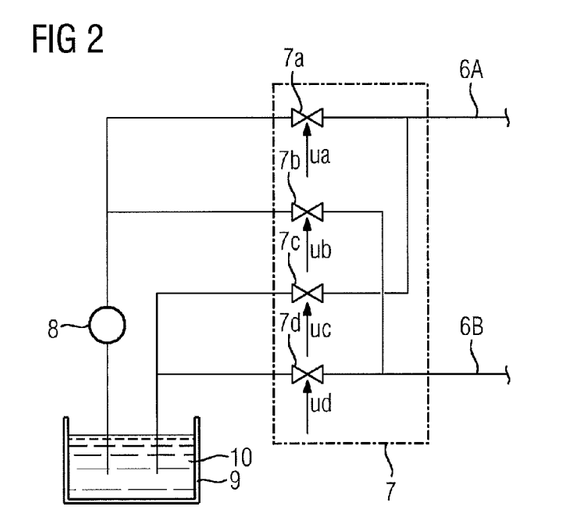
FIG. 2 shows the structure of a valve control device.

In accordance with FIG. 2 the valve control device 7 has a number of valve control units 7a to 7d. In particular the two working volumes 5A, 5B are each connected via a separate valve control unit 7a, 7b to the hydraulic pump 8 and are each connected via a separate further valve control unit 7c, 7d to the hydraulic reservoir 9. Each of the four valve control units 7a to 7d is supplied with a separate definitive manipulated variable ua to ud. The respective valve control unit 7a to 7d is activated in accordance with the respective definitive manipulated variable ua to ud.

It is possible that the valve control units 7a to 7d are proportional valves. Preferably however said valves involve binary-switched switching valves, which thus can only be switched back and forth between the states of completely open and completely closed but cannot assume any defined intermediate states. The valve control units 7a to 7d are activated in this case by a pulse-width-modulated and/or pulse-code-modulated activation.

The valve control device 7 and with it the entire hydraulic cylinder unit 1 is controlled by the control device 11. The control device 11 is preferably embodied in accordance with FIG. 1 as a software-programmable control device 11. The control device 11 is programmed in this case by a software module 12. The software module 12 can be supplied to the control device 11 for example by a data medium 13 on which the software module 12 is stored in machine-readable form. In principle any given data medium can be considered here as the data medium 13. Shown (purely by way of example) in FIG. 1 is a CD-ROM 13.

The software module 12 comprises machine code 14 which is able to be processed by the control device 11. The processing of the machine code 14 by the control device 11 has the effect that the control device 11 controls the hydraulic cylinder 1 in the way which will be explained in greater detail below. The programming of the control device 11 with the software module 12 results in the corresponding embodiment of the control device 11.

The control device 11 in accordance with FIG. 1 is initially supplied with a setpoint variable s*, F* and an actual variable s, F. It is possible that the supplied variables s*, F*, s, F involve a setpoint position s* to be taken up by the piston 3 and the actual position s taken up by the piston 3. As an alternative it is possible that the supplied variables s*, F*, s, F involve a setpoint force F* to be exerted by the piston 3 and an actual force F exerted by the piston 3. In accordance with FIG. 3 it is further possible as an alternative that the control device 11 is supplied with both pairs of values s*, s, F*, F and that by a switchover device 11' it is determined whether a position controller 15 or a force controller 15' of the control device 11 is active. The controllers 15, 15' can principally be any given controllers. An embodiment of the controllers 15, 15' as P controllers is however sufficient as a rule and is also preferred.

Figure 3:
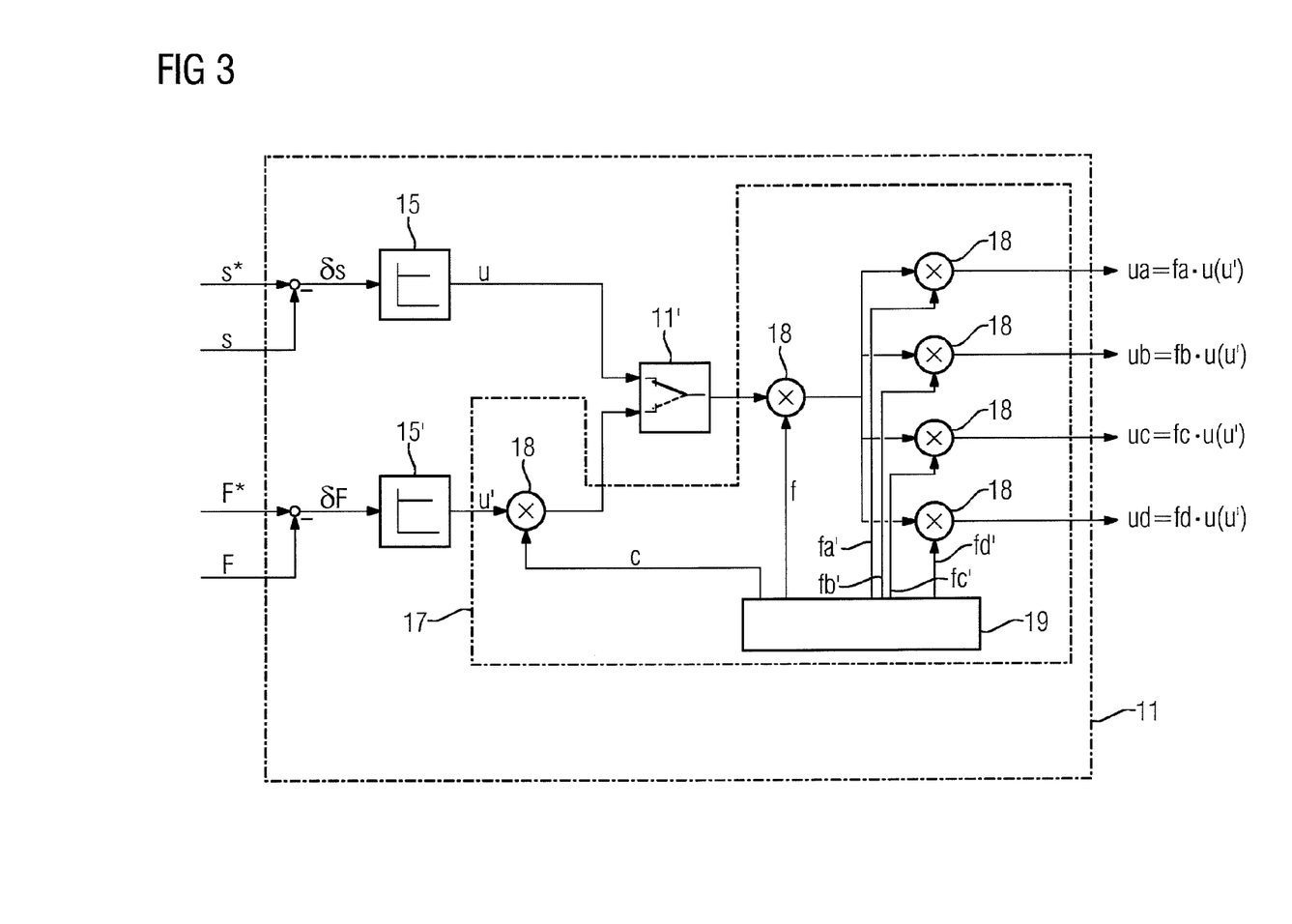
FIG. 3 shows the structure of the control unit, FIGS. 4 and 5 each show a determination device of a linearization unit.

Regardless of whether the control device 11 is embodied as a position controller 15 or as a force controller 15' or as a controller able to be switched over between position control and force control, the control unit 11 determines by the corresponding controller 15, 15' on the basis of the difference δs, δF between setpoint variable s*, F* and/or actual variable s, F, a preliminary manipulated variable u, u' for the valve control device 7 and outputs the manipulated variables u, u'. Through this the control device 11 carries out the corresponding control of the hydraulic cylinder unit 1 (more precisely: of the piston 3).

In accordance with FIG. 3 a linearization unit 17 is arranged downstream of the controllers 15, 15'. The linearization unit 17 has multipliers 18 and a determination device 19. The determination device 19 determines, in a way still to be explained, linearization factors fa to fd and outputs the linearization factors fa to fd to the multipliers 18. The multipliers 18 further accept from the controller 15 the preliminary manipulated variables u, u' and multiply the preliminary manipulated variables u, u' by the linearization factors fa to fd supplied to them. The linearization unit 17 determines in this way the definitive manipulated variables ua to ud, which are output to the valve control units 7a to 7d.

The valve control units 7a to 7d adjust the manipulated variables ua to ud transferred to them accordingly. The effect of this is that the piston 3 is displaced or adjusted with an adjustment speed v.

The determination device 19 of the linearization unit 17 determines the linearization factors fa to fd dynamically as a function of at least the actual position s of the piston 3, of the working pressures pA, pB obtaining on both sides of the piston 3 and also of the working pressures pP, pT obtaining on the pump and tank side of the valve control units 7a-7d. The determination device 19 determines the linearization factors fa to fd such that a ratio of the adjustment speed v during position control to the difference δs of setpoint position s* and/or actual position s and during force control to the difference δF of setpoint force F* and/or actual force F is independent of the actual position s and the working pressures pA, pB, pP, pT.

The way in which the determination device 19 operates will be explained below in greater detail in conjunction with FIGS. 4 and 5.

The control device 11 is usually clocked with an operating clock T. With the frequency of the operating clock T the control device 11 accepts a new setpoint variable s*, F* and a new actual variable s, F in each case, determines the manipulated variables ua to ud and outputs the manipulated variables ua to ud to the valve control units 7a to 7d.

Likewise with the operating clock T the determination device 19 is supplied in each case with a new value for the actual position s and the working pressures pA, pB obtaining on the two sides of the piston 3. Furthermore the determination device 19 is supplied with the leading sign of the control difference δs, δF. The supply of these variables s, pA, pB, δs, δF in a clocked manner is indicated in FIGS. 4 and 5 by a latch 19', which is clocked with the operating clock T, being disposed before the determination device.

The pump pressure pP and the tank pressure pT are constant as a rule. It is therefore possible for these two pressures pP, pT to be supplied to the determination device 19 once (i.e. in advance and thus as parameters). As an alternative however it is likewise possible to supply the pump-side working pressure pP and the tank-side working pressure pT to the determination device 19 in a clocked manner and thus as variables.

As a rule the determination device 19, for exact computation of the linearization factors fa to fd, needs further data. As a rule the further data comprises performance data pN, QNA, QNB of the valve control unit 7, the effective working surfaces AKA, AKB on both sides of the piston 3 as well as the minimum possible effective volumes VminA, VminB on both sides of the piston 3. These values can be predetermined to the determination unit 19 as fixed values, for example by the software module 12. As an alternative the further data—at least partly—can be predetermined to the determination device 19 after the programming of the control device 11 as parameters (i.e. as part of the putting into service of the control device 11), which will be retained unchanged during the operation of the control device 11.

The linearization factors fa to fd can be written in accordance with FIG. 3 as a product of a basic linearization factor f and a respective additional linearization factor fa' to fd'. The basic linearization factor f is uniform for all linearization factors fa to fd. The additional linearization factors fa' to fd' are individual for the respective linearization factors fa to fd.

The basic linearization factor f is dependent on the leading sign of the control difference δs, δF. In the case of a position control the basic linearization factor f is thus dependent on the direction of movement of the piston 3, i.e. on the direction in which the piston 3 is to be displaced. It is assumed below that the control difference δs, δF is greater than zero. In this case the determination device 19 preferably determines the basic linearization factor f as $$f = K \cdot \frac{\frac{AKA}{hA} + \frac{AKB}{hB}}{\sqrt{\frac{pP - pA}{pN}} \cdot \frac{QNA1}{hA} + \sqrt{\frac{pB - pT}{pN}} \cdot \frac{QNB2}{hB}}$$

The variables used in the above formula are already defined—with the exception of the performance data pN, QNA, QNB of the valve control unit 7. The performance data pN, QNA and QNB of the valve control unit 7 has the following meaning:

pN is a nominal pressure (principally any given pressure). It corresponds to a reference pressure to which the variables QNA1, QNA2, QNB1 and QNB2 are standardized.

QNA1 is a nominal volume flow which flows in the working volume 5A if a difference between the pump pressure pP and the working pressure pA obtaining in the working volume 5A is equal to the nominal pressure pN.

QNA2 is a nominal volume flow which flows out of the working volume 5A if the difference between the working pressure pA and the tank pressure pT is equal to the nominal pressure pN.

QNB1 and QNB2 are defined in a similar way—in relation to the operating volume 5B.

K is a freely-selectable scaling factor.

As already explained the basic linearization factor f is dependent on the leading sign of the control difference δs, δF. In the event of the control difference δs, δF being negative, the basic linearization factor f is preferably expressed as $$f = K \cdot \frac{\frac{AKB}{hB} + \frac{AKA}{hA}}{\sqrt{\frac{pP - pB}{pN}} \cdot \frac{QNB1}{hB} + \sqrt{\frac{pA - pT}{pN}} \cdot \frac{QNA2}{hA}}$$

The basic linearization factor f thus corresponds to the (single) linearization factor which is determined in DE 10 2007 051 857 B3 and the corresponding US document.

Figure 4:
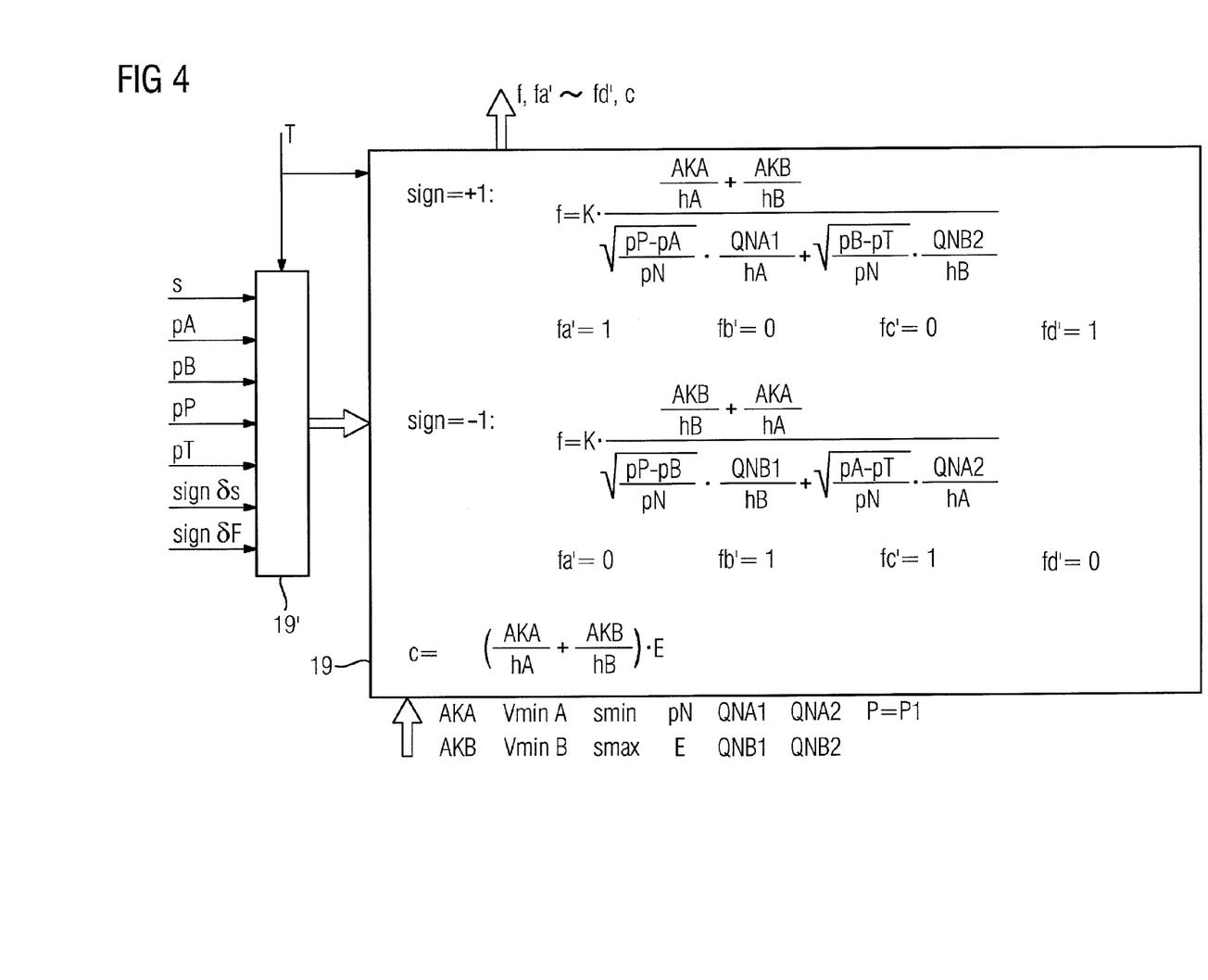
Figure 5:
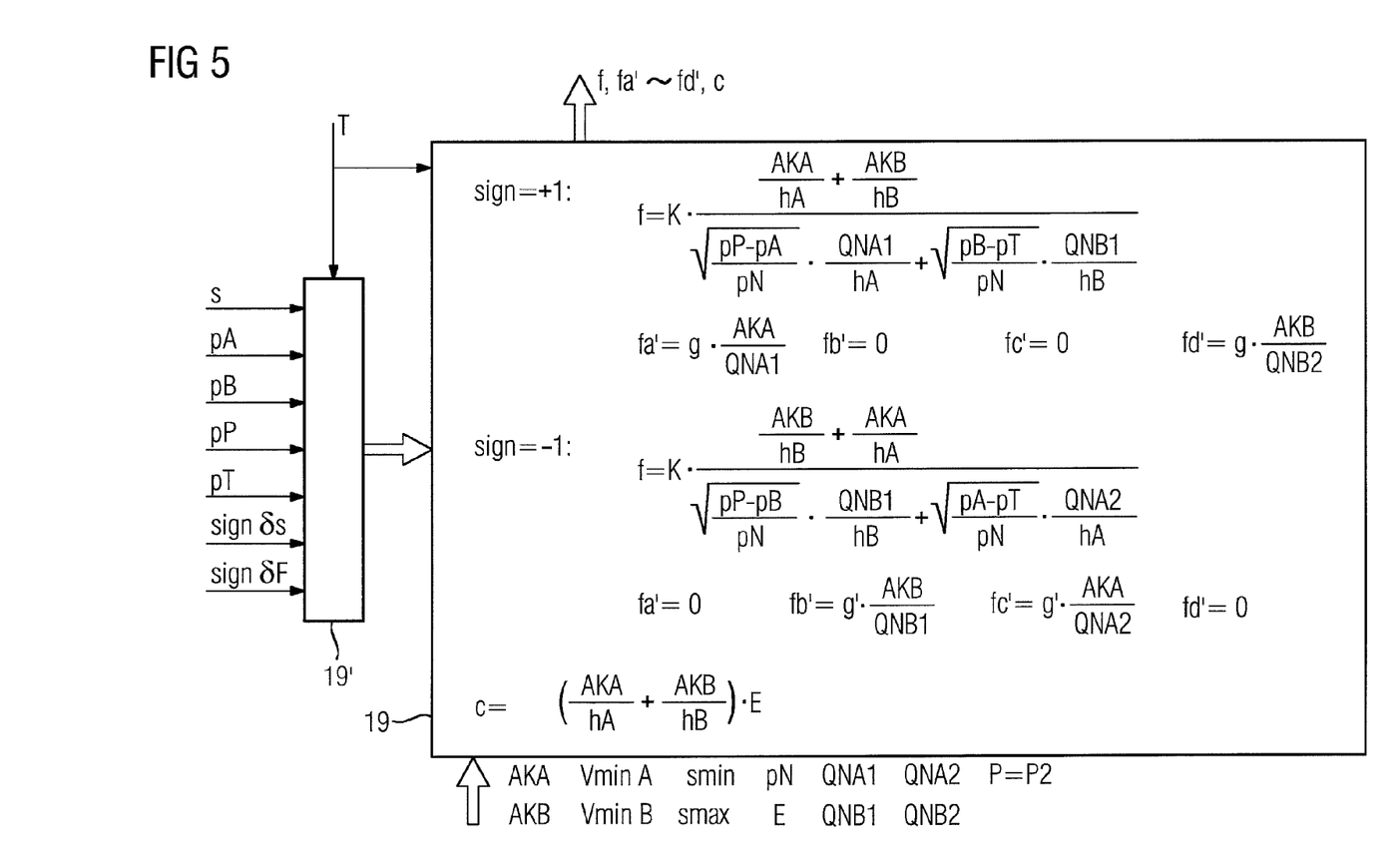

In the determination of the additional linearization factors fa' to fd' the determination device 19 preferably additionally takes account, in accordance with FIGS. 4 and 5, of a parameter P, which is supplied to the determination device 19 from outside, for example by an operator. The parameter P can—depending on the embodiment—be a binary variable, be an analog variable, be a plurality of binary variables and under some circumstances even be a plurality of analog variables.

If the control difference δs, δF is positive and the parameter P has a first value P1, the determination device 19, in accordance with FIG. 4, nsets the additional linearization factors fa' and fd' to values other than zero, the additional linearization factors fb' and fc' to the value zero. The additional linearization factors fa' and fd' can especially have the same value, for example the value 1.

If the control difference δs, δF is negative and the parameter P has a first value P1, the determination device 19, in accordance with FIG. 4, nsets the additional linearization factors fb' and fc' to values other than zero, the additional linearization factors fa' and fd' to the value zero. The additional linearization factors fb' and fc' can especially have the same value, for example the value 1.

If the parameter P has a second value P2, the determination device 19 determines the additional linearization factors fa' to fd' in accordance with FIG. 5, such that the working pressures pA, pB, pP, pT approximate to the equation $$pP+pT=pA+pB.$$

If the control difference δs, δF is positive, the determination device 19 in this case determines the additional linearization factors fa' and fd' as $$fa' = g \cdot \frac{AKA}{QNA1}$$

and $$fd' = g \cdot \frac{AKB}{QNB2}$$

with $$g = \frac{\sqrt{\frac{pP-pA}{pN}} \cdot \frac{QNA1}{hA} + \sqrt{\frac{pB-pT}{pN}} \cdot \frac{QNB2}{hB}}{\sqrt{\frac{pP-pA}{pN}} \cdot \frac{AKA}{hA} + \sqrt{\frac{pB-pT}{pN}} \cdot \frac{AKB}{hB}}$$

The additional linearization factors fb' and fc' have the value zero in this case.

If, on the other hand, the control difference δs, δF is negative, the determination device 19 in this case determines the additional linearization factors fb' and fc' as $$fb' = g' \cdot \frac{AKB}{QNB1}$$

and $$fc' = g' \cdot \frac{AKA}{QNA2}$$

with $$g' = \frac{\sqrt{\frac{pA-pT}{pN}} \cdot \frac{QNA2}{hA} + \sqrt{\frac{pP-pB}{pN}} \cdot \frac{QNB1}{hB}}{\sqrt{\frac{pA-pT}{pN}} \cdot \frac{AKA}{hA} + \sqrt{\frac{pP-pB}{pN}} \cdot \frac{AKB}{hB}}$$

The additional linearization factors fa' and fd' have the value zero in this case.

A method of operation has been explained above in which the linearization factors fa to fd are determined as a product of the basic linearization factor f and a respective additional linearization factor fa' to fd'. Naturally a direct determination of the linearization factors fa to fd—i.e. without the detour via the product formation—is possible.

Furthermore the linearization factors fa to fd, which are necessary to cause a linearization in position-controlled operation of the hydraulic cylinder units 1, have been explained above. If a force regulation is performed, in accordance with the diagram depicted in FIG. 3, only a scaling with a spring constant c of the hydraulic fluid 10 is required. The spring constant c is expressed as $$c = \left( \frac{AKA}{hA} + \frac{AKB}{hB} \right) \cdot E$$

E here means the elasticity constant of the hydraulic fluid 10.

Figure 6:
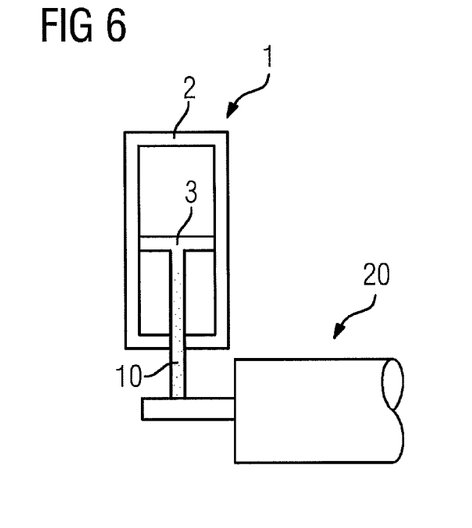
FIG. 6 shows an adjustment device for a roller of a roll stand.

The proposed arrangement of hydraulic cylinder unit 1 and control device 11 is principally able to be employed in any given way. Preferably however it is used in accordance with FIG. 6 for controlling the adjustment of a roll stand 20 shown schematically in FIG. 6.

The proposed control device has many advantages, in particular there is optimum operation of the control device 11 at any operating point of the hydraulic cylinder unit 1. The control is completely linearized. Transformations (compare non-linear HGC) are not necessary. Furthermore—likewise by contrast with linear HGC—it is possible to incorporate the proposed control device into existing control systems in a simple manner, since overlaid control structure is already present (into meshed controls and the like) do not have to be changed. A simplified putting into operation and maintenance capability of the control device 11 is thus produced.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A control device for controlling a hydraulic cylinder unit, comprising:
    a controller to receive on an input side, a setpoint variable and an actual variable and to determine a preliminary manipulated variable for valve control units of the hydraulic cylinder unit, the preliminary manipulated variable is determined based on a difference between the setpoint variable and the actual variable, the setpoint variable and the actual variable respectively being one of (i) a setpoint position for a piston of the hydraulic cylinder unit and an actual position of the piston of the hydraulic cylinder unit and (ii) a setpoint force to be exerted by the piston and an actual force exerted by the piston; and
    a linearization unit arranged downstream of the controller to receive the preliminary manipulated variable, to determine linearization factors, to determine definitive manipulated variables, and to output the definitive manipulated variables respectively to the valve control units so that the piston is adjusted with an adjustment speed, the definitive manipulated variables being determined based on the preliminary manipulated variable and the linearization factors, wherein the linearization unit determines the linearization factors dynamically as a function of the actual position of the piston and working pressures, the working pressures comprising a pressure on a first side of the piston, a pressure on a second side of the piston, a pressure on a pump side of the valve control units and a pressure on a tank side of the valve control units, the linearization unit determines the linearization factors such that a ratio of the adjustment speed to the difference between setpoint variable and the actual variable is independent of the actual position of the piston and the working pressures, the linearization unit determines first through fourth linearization factors, and if the parameter has a first value, the linearization unit determines the linearization factors such that first and second linearization factors have a value of zero and third and fourth linearization factors have a value differing from zero.

2. The control device as claimed in claim 1, wherein
the linearization unit is additionally supplied with a parameter, and
the linearization unit takes account of the parameter in determination of the linearization factors.

3. The control device as claimed in claim 2,
if the parameter has a second value, the linearization unit determines the linearization factors such that a sum of the pressures on the first and second sides of the piston approximates a sum of the pressures on the pump side and the tank side of the valve control units.

4. The control device as claimed in claim 1, wherein
the valve control units are embodied as binary-switched switching valves.

5. The control device as claimed in claim 1, wherein
the control device is embodied as a software-programmable control device programmed with a software module.

6. The control device as claimed in claim 1, wherein,
the valve control units comprise four valves,
the tank side of the valve control units comprises a hydraulic fluid tank,
the pump side of the valve control units comprises a pump to pump hydraulic fluid from the hydraulic fluid tank,
the first and second sides of the piston are connected to the pump respectively by first and second valves, and
the first and second sides of the piston are connected to the hydraulic fluid tank respectively by third and fourth valves.

7. The control device as claimed in claim 6, wherein,
the controller determines first through fourth preliminary manipulated variables,
the first through fourth preliminary manipulated variables are multiplied by the first through fourth linearization factors to produce first through fourth definitive manipulated variables, and
the first through fourth definitive manipulated variables are supplied respectively to the four valves.

8. A non-transitory computer readable storage medium storing a program, which when executed by a processor, causes the processor to perform a method comprising:
receiving a setpoint variable and an actual variable, the setpoint variable and the actual variable respectively being one of (i) a setpoint position for a piston of a hydraulic cylinder unit and an actual position of the piston of the hydraulic cylinder unit and (ii) a setpoint force to be exerted by the piston and an actual force exerted by the piston;
determining a preliminary manipulated variable for valve control units of the hydraulic cylinder unit, the preliminary manipulated variable being determined based on a difference between the setpoint variable and the actual variable;
determining linearization factors;
determining definitive manipulated variables based on the preliminary manipulated variable and the linearization factors; and
outputting the definitive manipulated variables respectively to the valve control units so that the piston is adjusted with an adjustment speed, wherein
the linearization factors are determined dynamically as a function of the actual position of the piston and working pressures, the working pressures comprising a pressure on a first side of the piston, a pressure on a second side of the piston, a pressure on a pump side of the valve control units and a pressure on a tank side of the valve control units,
the linearization factors are determined such that a ratio of the adjustment speed to the difference between setpoint variable and the actual variable is independent of the actual position of the piston and the working pressures,
first through fourth linearization factors are determined, and
if the parameter has a first value, the linearization factors are determined such that first and second linearization factors have a value of zero and third and fourth linearization factors have a value differing from zero.

9. A method comprising:
receiving a setpoint variable and an actual variable, the setpoint variable and the actual variable respectively being one of (i) a setpoint position for a piston of a hydraulic cylinder unit and an actual position of the piston of the hydraulic cylinder unit and (ii) a setpoint force to be exerted by the piston and an actual force exerted by the piston;
determining a preliminary manipulated variable for valve control units of the hydraulic cylinder unit, the preliminary manipulated variable being determined based on a difference between the setpoint variable and the actual variable;
determining linearization factors;
determining definitive manipulated variables based on the preliminary manipulated variable and the linearization factors; and
outputting the definitive manipulated variables respectively to the valve control units so that the piston is adjusted with an adjustment speed, wherein
the linearization factors are determined dynamically as a function of the actual position of the piston and working pressures, the working pressures comprising a pressure on a first side of the piston, a pressure on a second side of the piston, a pressure on a pump side of the valve control units and a pressure on a tank side of the valve control units,
the linearization factors are determined such that a ratio of the adjustment speed to the difference between setpoint variable and the actual variable is independent of the actual position of the piston and the working pressures,
first through fourth linearization factors are determined, and if the parameter has a first value, the linearization factors are determined such that first and second linearization factors have a value of zero and third and fourth linearization factors have a value differing from zero.

10. The method as claimed in claim 9, further comprising: using the hydraulic cylinder unit to control a roll stand.

* * * * *